(12) United States Patent
Liu et al.

(10) Patent No.: US 7,583,214 B2
(45) Date of Patent: *Sep. 1, 2009

(54) DYNAMIC RECEIVE BEAMFORMER WITH OVERSAMPLING FOR MEDICAL DIAGNOSTIC ULTRASOUND

(75) Inventors: D-L Donald Liu, Issaquah, WA (US); Daniel Edward Brueske, Sammamish, WA (US); Brian Vincent Colby, Renton, WA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/731,567

(22) Filed: Mar. 30, 2007

(65) Prior Publication Data

US 2007/0229336 A1  Oct. 4, 2007

Related U.S. Application Data

(60) Provisional application No. 60/787,801, filed on Mar. 31, 2006, provisional application No. 60/793,055, filed on Apr. 19, 2006.

(51) Int. Cl.
*H03M 3/00* (2006.01)
(52) U.S. Cl. .................................. 341/143; 600/447
(58) Field of Classification Search ......... 341/140–170; 600/447
See application file for complete search history.

(56) References Cited

U.S. PATENT DOCUMENTS

| 4,857,928 | A | | 8/1989 | Gailus et al. |
| 5,203,335 | A | | 4/1993 | Noujaim et al. |
| 5,555,534 | A | | 9/1996 | Maslak et al. |
| 5,568,446 | A | | 10/1996 | Engeler |
| 5,825,318 | A | * | 10/1998 | Patapoutian et al. ........ 341/131 |
| 5,964,708 | A | | 10/1999 | Freeman et al. |
| 6,110,116 | A | | 8/2000 | Wright et al. |
| 6,135,961 | A | | 10/2000 | Pflugrath et al. |
| 6,154,161 | A | * | 11/2000 | Leme et al. ................. 341/143 |
| 6,208,189 | B1 | | 3/2001 | Freeman et al. |

(Continued)

FOREIGN PATENT DOCUMENTS

EP    0 411 473 A2   2/1991

(Continued)

OTHER PUBLICATIONS

Freeman S. R., et al.: "An Ultrasound Beamformer Using Oversampling" Ultrasonics Symposium, 1997. Preceedings., 1997 IEEE Toronto, Ont., Canada Oct. 5-8, 1997, IEEE, US, vol. 2, Oct. 5, 1997, pp. 1687-1690, XP010271621, ISBN: 0-7803-4153-8.

(Continued)

*Primary Examiner*—Lam T Mai (57) ABSTRACT

Receive beamformers for receive beamforming ultrasound information include a plurality of channels. The received signals for each channel are oversampled for conversion to digital form, such as sampling with a sigma-delta converter. The reconstruction of the samples into data at the Nyquist or other rate is performed in stages. Partial reconstruction to a rate less than the oversampling rate, but greater than the Nyquist rate, occurs prior to summation across channels. Delays are implemented by selecting data from the sample stream. After summation, the samples are reconstructed at a Nyquist or other rate.

21 Claims, 6 Drawing Sheets

U.S. PATENT DOCUMENTS

| | | | |
|---|---|---|---|
| 6,364,836 B1 | 4/2002 | Fukukita et al. | |
| 6,366,227 B1 | 4/2002 | Rigby | |
| 6,373,418 B1 | 4/2002 | Abbey | |
| 6,373,523 B1 * | 4/2002 | Jang | 348/273 |
| 6,423,006 B1 | 7/2002 | Banjanin | |
| 6,475,148 B1 | 11/2002 | Jackson et al. | |
| 6,602,194 B2 | 8/2003 | Roundhill et al. | |
| 6,690,748 B2 * | 2/2004 | Martin | 375/324 |
| 6,785,529 B2 | 8/2004 | Ciccarelli et al. | |
| 6,801,148 B2 | 10/2004 | Freeman et al. | |
| 6,867,720 B1 | 3/2005 | Freeman et al. | |
| 6,895,123 B2 | 5/2005 | Li et al. | |
| 6,943,715 B2 * | 9/2005 | Radja et al. | 341/143 |
| 6,992,606 B2 | 1/2006 | Zogakis et al. | |
| 2003/0105399 A1 | 6/2003 | Morsy | |
| 2004/0189499 A1 | 9/2004 | Han et al. | |
| 2005/0068221 A1 | 3/2005 | Freeman et al. | |
| 2005/0117663 A1 | 6/2005 | Drogi et al. | |
| 2007/0236374 A1 | 10/2007 | Brueske et al. | |

FOREIGN PATENT DOCUMENTS

| | | |
|---|---|---|
| WO | WO 00/10638 A | 3/2000 |
| WO | WO 2004/030222 A1 | 4/2004 |

OTHER PUBLICATIONS

Freeman, et al., Delta-Sigma Oversampled Ultrasound Beamformer with Dynamic Delays, IEEE Trans. on Ultrasonics, Ferroelectronics, and Frequency Control, vol. 46, No. 2, Mar. 1999.

PCT Invitation to Pay Additional Fees from the International Searching Authority, 5 pages total.

PCT International Search Report and PCT Written Opinion of the International Searching Authority, 11 pages total, mailed Jul. 1, 2008.

* cited by examiner

DYNAMIC RECEIVE BEAMFORMER WITH OVERSAMPLING FOR MEDICAL DIAGNOSTIC ULTRASOUND

RELATED APPLICATIONS

The present patent document claims the benefit of the filing date under 35 U.S.C. §119(e) of Provisional U.S. Patent Application Ser. Nos. 60/787,801, filed Mar. 31, 2006, and 60/793,055, filed Apr. 19, 2006, which are hereby incorporated by reference.

BACKGROUND

The present embodiments relate to receive beamforming for medical diagnostic ultrasound. In particular, the receive beamformer includes an oversampling analog-to-digital converter for digital receive beamforming.

Oversampling converters (e.g., sigma-delta converters) digitize analog signals coarsely using a single or a few bits but at a sampling rate much higher than the Nyquist rate. Oversampling converters may be implemented more easily using modern VLSI technology compared to conventional Nyquist rate, multi-bit A/D converters. Using oversampling, the need for anti-aliasing filters and digital interpolation to reduce delay quantization error may be reduced.

Figure 1A:
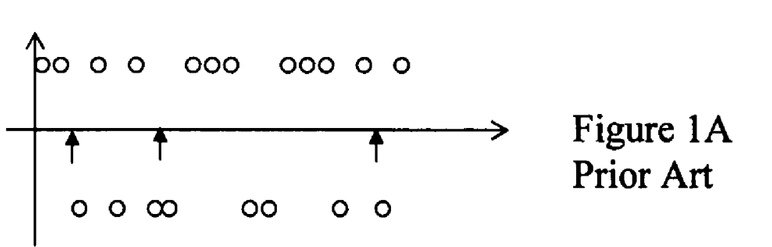
FIGS. 1A-C represent prior art approaches for dynamic focusing with sigma-delta based receive beamformers.
Figure 1B:
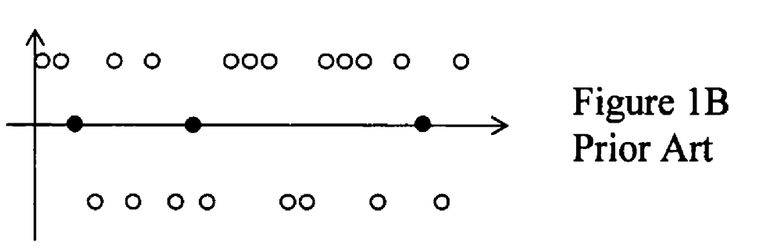
Figure 1C:
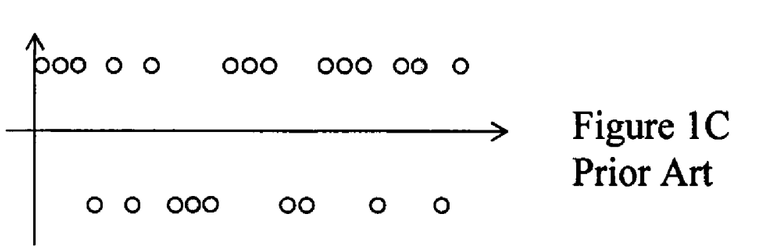

In beamforming, dynamic receive focusing requires that channel signals be relatively delayed for coherent summation. The focusing delay is larger at shallower depths and smaller at deeper depths. The delay also varies with element position within an aperture. Implementing this dynamic delay change using the single-bit output stream from sigma-delta converters may be difficult. The data may be dynamically stretched where the amount of stretching varies with depth or time. FIG. 1A shows arrows indicating a location for stretching or extending the original single-bit sigma-delta output. One solution is to insert a zero where a stretch is needed as shown in FIG. 1B. Because zero insertion does not add "energy" to the data, the demodulated output is a good approximation of a stretched version of the original signal. However, three output states (1, 0, −1) and two output bits are required. Another approach is to repeat a sample (e.g., a 1 or −1) as shown in FIG. 1C. Repeating the previous sample does not require an extra bit, but adds "energy" to the bit stream that, after decoding, leads to noise in the reconstructed signal.

Various ways to address this problem have been described. U.S. Pat. No. 6,366,227 describes 3 approaches: 1) always add a +1 followed by a −1, which doubles the delay quantization error; 2) find symmetrical channels, add +1 to one channel and −1 to the other; or 3) keep track of all the +1 or −1's that have been added and subtract them later from the beam sum. U.S. Pat. No. 6,867,720 describes varying the feedback coefficient in a sigma-delta converter. For a sample that is to be repeated, this cuts feedback gain to ½ of normal gain. U.S. Pat. No. 6,895,123 describes separating the receive delay profile into a steering component and a focusing component. The steering component does not change with depth and poses no problem. The focusing component changes with depth but is symmetric about the beam origin. The focusing component is implemented in pairs by adding +1 in one signal and −1 in another signal that is symmetric with the first signal. U.S. Patent Application Publication Number 2004/0189499 describes an architecture of filtering the bit stream for each channel at the signal Nyquist rate, not the oversampling rate. The filtering is at a timing determined by dynamic receive focusing and occurs before summing the channels together. However, these techniques may be complex to implement.

BRIEF SUMMARY

By way of introduction, the preferred embodiments described below include methods, systems, and receive beamformers for receive beamforming ultrasound information. The received signals for each channel are oversampled for conversion to digital form, such as sampling with a sigma-delta converter. Delays are implemented by selecting data from the sample stream. The reconstruction of the selected samples into data at the Nyquist or other rate is performed in stages. Partial reconstruction to a rate less than the oversampling rate, but greater than the Nyquist rate, occurs prior to summation across channels. After summation, the samples are reconstructed at a Nyquist or other rate.

In a first aspect, a receive beamformer system is provided for beamforming ultrasound information. First and second receive channel paths each include a sigma-delta analog-to-digital converter and a first decimation circuit connected with an output of the converter. A summer connects with the first and second receive channel paths. A second decimation circuit connects with an output of the summer.

In a second aspect, a method is provided for receive beamforming ultrasound information. Received signals are oversampled in at least two channels. First higher bit width signals are partially reconstructed, in the at least two channels, from the oversampled received signals. The first higher bit width signals have a higher bit width than the oversampled received signals. The first higher bit width signals from the at least two channels are summed. Second higher bit width signals are reconstructed from the summed first higher bit width signals. The second higher bit width signals having a higher bit width than the first higher bit width signals.

In a third aspect, a system is provided for receive beamforming ultrasound information. An oversampling analog-to-digital converter outputs to a first low pass filter operable to construct first samples with a greater bit width than output from the converter. A summer is operable to sum the greater bit width samples with other samples. A second low pass filter is operable to construct second samples from an output of the summer. The second samples have a greater bit width than the first samples.

The present invention is defined by the following claims, and nothing in this section should be taken as a limitation on those claims. Further aspects and advantages of the invention are discussed below in conjunction with the preferred embodiments and may be later claimed in combinations or independently.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

In the receive beamformer, filters are applied to single-bit or other oversampled channel data. The filters are applied to data selected by a dynamic receive delay controller. The filters construct multi-bit samples at a reduced sampling rate. These multi-bit samples are then apodized and summed with other channels. Then, another filter further filters and decimates the beam sum. For example, the first filter is a Kth-order comb filter with an order being one above the order of the sigma-delta converter, and the beam sum filter may be a low-pass filter with a finite or infinite impulse response.

This architecture allows selection or variation between 2 extremes. In one extreme, there is no channel demodulation and the beam sum is computed at the sigma-delta rate. This first extreme often leads to dynamic receive artifacts. In another extreme, complete channel demodulation is provided by long low-pass filters for each channel and the beam sum is computed at the signal Nyquist rate. The second extreme is complicated because of the long demodulation filters required for each channel, making the approach expensive and unsuitable for implementation with parallel beamforming because the long channel filters have to be duplicated or time-multiplexed.

U.S. Pat. No. 7,466,256, filed the same day as the current application, shows other embodiments, and is incorporated herein by reference.

Figure 2:
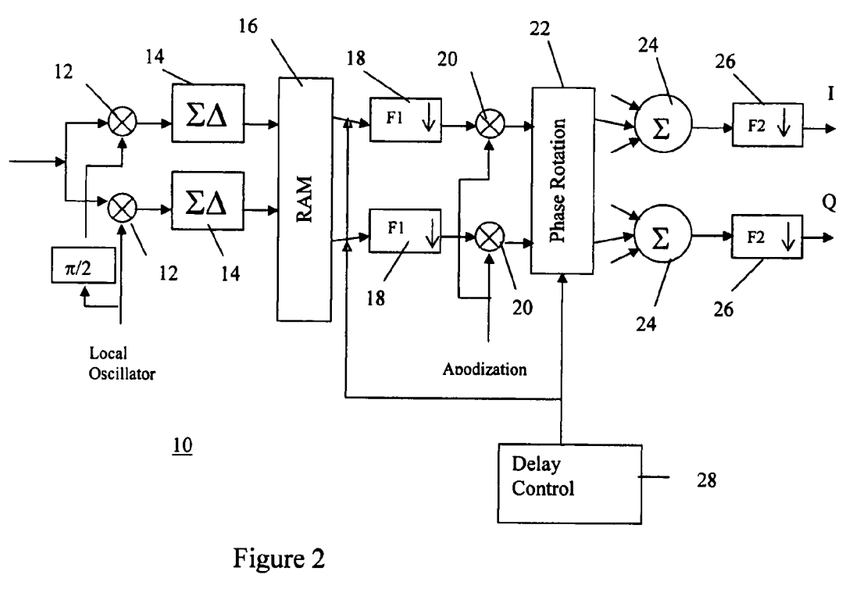
FIG. 2 is a block diagram of one embodiment of a base band receive beamformer system.

FIG. 2 shows a system 10 for receive beamforming ultrasound information. The system 10 is a receive beamformer system. The system 10 is positioned in a medical diagnostic ultrasound imaging system. For example, the receive beamformer is in a cart or portable imaging system and connects with a transducer through a cable or wires. In other embodiments, the receive beamformer or a portion of the receive beamformer is positioned in a transducer probe handle. Cables, wires, or a wireless connection provide data to the rest of the imaging system, such as a computer.

The system 10 includes a plurality of receive channels. Any number of channels may be provided, such as 32, 64, 128, 194, 256, 1024, or other number. Each channel corresponds to one or more elements. The channels separately apply relative focusing and apodization. The data from the channels is summed to form data representing a beam or sub-array beam. For each scan line or beam, a focusing and apodization profile is applied across the channels. The profiles may change as a function of time or depth for dynamic receive focusing.

The system 10 is implemented on one or more integrated circuits. For example, separate chips are provided for groups of channels, such as 16, 128, 256, 512, 1024, or other numbers of channels being implemented on a chip. Cascaded summers may be provided on the same chip, or the summer or summers and downstream components are on one or more different chips. Other circuit implementations may be provided, such as using sequential separation between chips, using a processor, or using a field programmable gate array.

FIG. 2 shows one of the channels. The other channels have the same or different components. The channel includes the analog mixers 12, the oversampling analog-to-digital converters 14, the delay memory 16, the reconstruction filters 18, the apodization multipliers 20, and phase rotator 22. Additional, different, or fewer components may be provided. For example, focusing is provided in delay and phase rotation stages. In other embodiments, focusing is provided with only delay or only phase rotation stages. As another example, the apodization multipliers 20 are positioned before the reconstruction filters 18 or after the phase rotator 22, or in combination with the phase rotator 22.

The analog mixers 12 are multipliers or other mixers and a source of an oscillating signal, such as a crystal and phase locked loop. The received signals are mixed with the local oscillation signal. Two analog mixers 12 allow mixing with the local oscillating signal with 90-degree phase difference. The analog mixers 12 provide in-phase and quadrature (IQ) signals. The local oscillation signal is at a receive center frequency. The IQ signals are at a base band frequency for base band beamforming. Alternatively, the IQ signals are demodulated to an intermediate frequency band.

The IQ signals are low-pass signals, so may be converted by a conventional low-pass sigma-delta converter 14 as opposed to a band pass converter. Because of the reduced frequency bandwidth, a higher oversampling ratio can be used and the resulting dynamic range is higher. Higher dynamic range may allow the same beamformer to operate for both B-mode imaging and PW (or even Steered CW) Doppler imaging. The sigma-delta converter offers a trade-off between dynamic range and signal bandwidth that matches the requirements of ultrasound signal processing in various modes, such as B-mode and color flow mode. For example, with the $2^{nd}$ order sigma-delta converter, the dynamic range increases by 15 dB for every halving of signal bandwidth. No low-pass filter may be needed after mixing to remove the second harmonic component because of the high sampling rate of the sigma-delta converter 14 and subsequent digital low-pass filtering. In alternative embodiments, a low pass filter is provided after mixing and before conversion.

Figure 3:
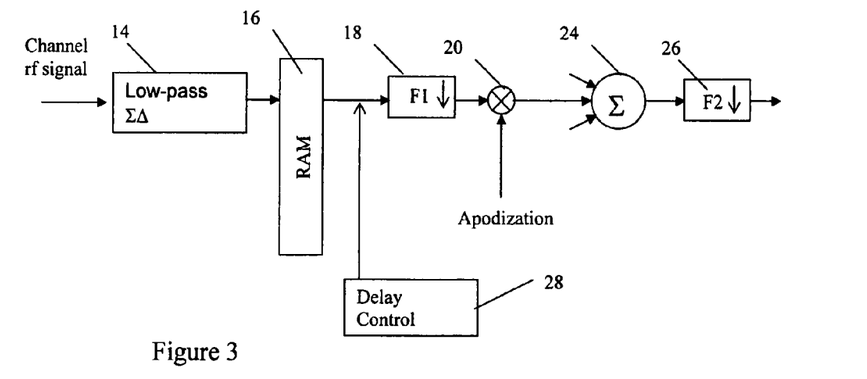
FIG. 3 is a block diagram of one embodiment of a radio frequency receive beamformer system.

In an alternative embodiment shown in FIG. 3, the beamformer system 10 operates with radio frequency received signals. The analog mixers 12 are not provided. The resulting channel includes a single path. This embodiment may use less hardware, but may have less dynamic range since band pass signals lead to a lower oversampling ratio for a low-pass sigma-delta converter.

The oversampling converters 14 are sigma-delta or other converters operable to sample higher than the Nyquist rate (e.g., two or more times higher). The oversampling converters 14 are first, second, or higher order converters. For example, a second order converter 14 with two integrators is provided for higher dynamic range. In one embodiment, a 2nd order 240 MHz sampling converter 14 is provided with single bit quantization. In another embodiment, a 1st order 480 MHz sampling converter is provided with single bit quantization. Since base band signals are being sampled in the embodiment of FIG. 2, the converters 14 are low-pass converters. Other oversampling converters may be used. Two converters 14 are provided in each receive channel, one for each of the IQ signals.

In oversampling converters 14, such as a sigma-delta converter, high dynamic range is achieved by using low-bit-width, high sampling rate, and noise shaping by which the noise energy is pushed away in spectrum from the signal bandwidth. The sampling rate is much higher compared to the Nyquist rate. The Nyquist rate is based on the center frequency of the received signals, such as a center frequency of 1-20 MHz. The converter 14 outputs samples at a rate at least 20, such as 20-200, times the Nyquist rate. The sampling bit width is low, such as one bit. Higher bit widths, such as two, four, or more, may be provided. The converters 14 shape quantization noise and filter to maximize in-band SNR based on the nature of the conversion.

Figure 4:
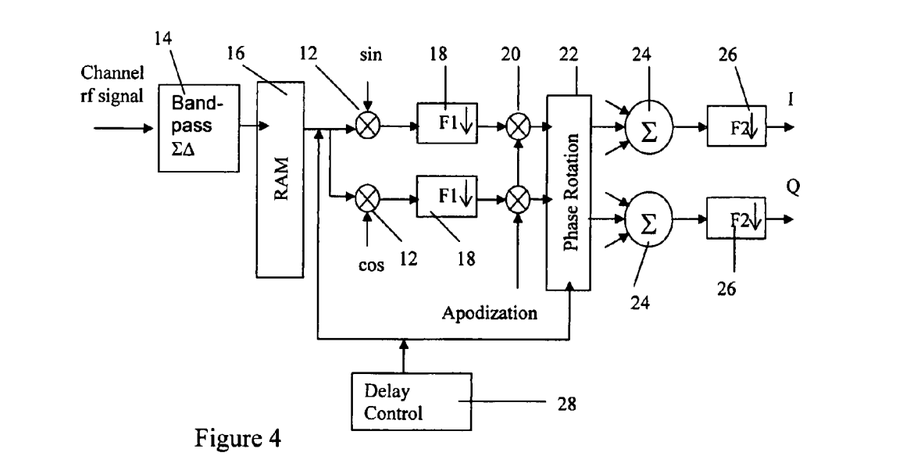
FIG. 4 is a block diagram of one embodiment of a receive beamformer system with a band pass converter and base band processing.

In an alternative embodiment shown in FIG. 4, the converter 14 is a band-pass converter. The band-pass converter 14 operates on radio frequency data and may provide more dynamic range than associated with the embodiment of FIG.

3. Any mixing to base band is performed by digital mixers 12. The band-pass converter 14 may be tuned for use with specific types of transducers. The low pass converter 14 of FIG. 2 may more likely allow connection with transducers that operate at different frequencies.

Referring again to FIG. 2, the memory 16 is a random access memory, buffer, shift register, or other memory. The memory 16 is a single or multi-bit memory, and includes sufficient memory slots to provide the needed delay range for steering and focusing. The memory 16 receives samples at the oversampling rate. The samples are stored. The memory 16 is large enough to store samples associated with the largest delay. The memory 16 is operable to output different selections of samples. Based on the delay and window size, samples for a desired focus are selected from the memory for beamforming. The window size is based on the number of samples for use in partial reconstructed by the filter 18, such as 10 to 1000 samples. A sufficient number of samples associated with a given delay are selected to allow filtering by the filter 18.

The delay controller 28 is a processor, control processor, digital signal processor, application specific integrated circuit, field programmable gate array, analog circuit, digital circuit, look-up table, memory, or combinations thereof. The controller 28 controls the output of the memory 16. The controller 28 selects stored data from the memory 16 as a function of a delay for the beam. The controller 28 may include a same or different component for selecting phase rotations associated with the samples for fine focusing with the phase rotator 22. The selected samples are output to the filter 18.

The filter 18 is a reconstruction filter or other circuit operable as a decimation circuit. For example, a comb filter with multiple stop bands is used. The filter 18 may be a poly-phase filter operable to effectively interpolate an input signal to a higher time resolution than a sampling interval of the oversampling converter. The filter 18 is operable to dynamically decimate under control of the dynamic delay controller 28. The filter 18 is one order above the order of the converter 14, but may have a same, lesser, or even higher order relative to the converter 14.

The filter 18 partially reconstructs the samples. The filter 18 reduces the incoming samples in rate, such as by decimation. Any decimation scale may be used, such as reducing the rate to a half, a quarter, an eighth or more. The filter 18 may increase the samples in bit width, such as by combination in filtering. Any increase in bit width may be used, such as changing from one bit to three, four, five, six, or more bit samples. For example, the filter 18 outputs signals oversampled less than output by the oversampling converters 14 and more than output by the second filter 26. The filter 18 outputs signals with a bit width greater than output by the oversampling converters 14 and less than output by the second filter 26. The beam sum is computed at a high rate but using only a few bits as compared to Nyquist sampling. To improve digitization accuracy or for other purposes such as channel-wise decoding of coded-excitation, the filters 18 are cascaded with additional filters for each channel.

The multiplier 20 is an amplifier, digital processor, digital circuit, filter, or other device operable to amplify or reduce amplitude of the samples output by the filter 18. The multiplier 20 applies apodization to the samples. The apodization applied may vary from channel-to-channel and/or depth-to-depth. In alternative embodiments, a substractor, divider, adder, or other component implements the apodization weighting.

The phase rotator 22 is a multiplier and adder, mixer, CORDIC phase rotator, or other phase rotator. The phase rotator 22 is a single component or separate component for acting on the in-phase and quadrature samples. The phase rotator 22 varies the phase of the complex samples represented by the in-phase and quadrature samples. The phasing provides for fine focusing. For radio-frequency embodiments, the phase rotator is not provided.

The summer 24 is a node, digital summer, processor, digital circuit, or other device for combining digital samples. The summer 24 sums the relatively apodized and focused signals from a plurality of channels. Multiple input arrows are shown for each summer 24 to reflect inputs from the multiple channels. The summer 24 is a single multiple input summer or a cascade of summers each having two or more inputs. The summer 24 is a multiple bit sample summer, such as summing four or six bit samples.

The filter 26 is a reconstruction or other circuit operable as a decimation circuit. The filter 26 is a low pass filter operable to construct samples from an output of the summer 24. The filter 26, with the filter 18, reconstructs the samples. Each filter 18, 26 is a partial reconstruction filter. For dynamic receive focusing, a medium-bit-width output is computed by the filter 18 at a decimated rate and at varying sampling intervals controlled by a delay calculator. The summed signal is further filtered using the filter 26 and decimated to produce the beamforming output.

The filter 26 reconstructs the samples. The filter 26 reduces the incoming samples in rate, such as by decimation. Any decimation scale may be used, such as reducing the rate to a half, a quarter, an eighth or more. In one embodiment, the decimation scale is set to provide samples substantially at the Nyquist rate. In alternative embodiments, rates greater than the Nyquist rate may be used. The reconstructed samples are high-bit-width samples reconstructed to the Nyquist or other desired rate. The filter 26 may increase the samples in bit width, such as by combination in filtering. Any increase in bit width may be used, such as changing from two or more bits to eight, ten, twelve, sixteen, or other number of bits per sample. The filter 26 outputs samples with a bit width greater and a rate less than output by the filter 18 and summer 24. Alternatively, the bit width remains the same.

In one embodiment, the receive beamformer uses less power than a non-sigma delta digital receive beamformer, such as $1/10^{th}$ the power. Cost may also be less. The use of less power may more likely allow integration of the dynamic digital receive beamformer in a handheld transducer probe. The receive beamformer provides for integrated time-delay based beamforming in a probe head. As integrated circuit feature sizes continue to shrink and operation frequencies rise, sigma-delta conversion may become even more advantageous.

More than one beam may be formed at substantially the same time. To form parallel beams in base-band, the circuitry to the right of the memory 16 is operated in a time-multiplexing fashion. The circuit produces output samples for different beams at different times. For example, one, two, or more beam sums are calculated in each repetition of a sequence. Other interleaving of the beamformer may be used. This is possible because the output sample is needed at a decimated rate compared to the input sampling rate.

Different focusing delay and/or apodization profiles are applied to the same received signals. In one embodiment, one of the beamformers of FIGS. 2-4 operates in a time-multiplexed manner to form two or more beams from the same received signals. The memory 16 buffers the data to allow selection for delay and other downstream processing from the same data multiple times. The receive beamformer paths are synchronized to sum data for the desired beam at a give time. The channel, summer 24, and filter 26 switch between beams as a function of time.

Figure 5:
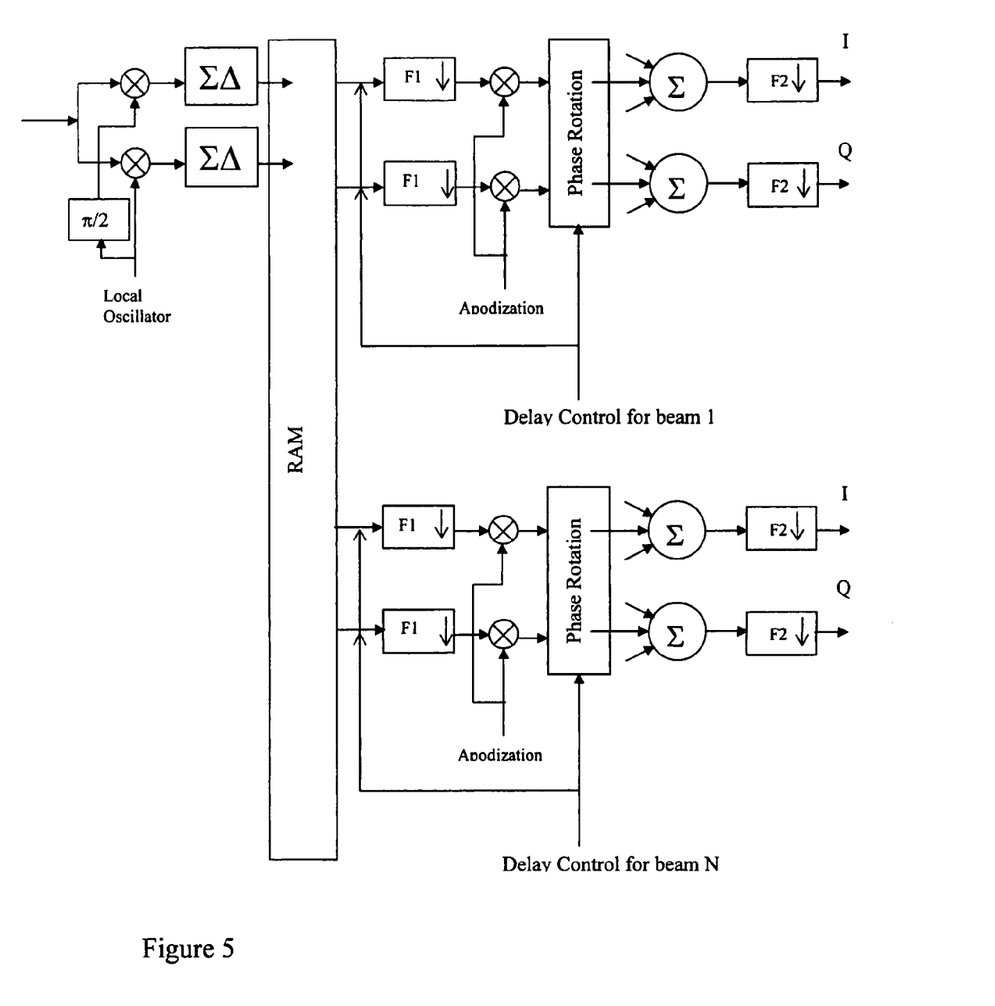
FIG. 5 is a block diagram of one embodiment of a base band receive beamformer system for multiple simultaneous beam formation.
Figure 6:
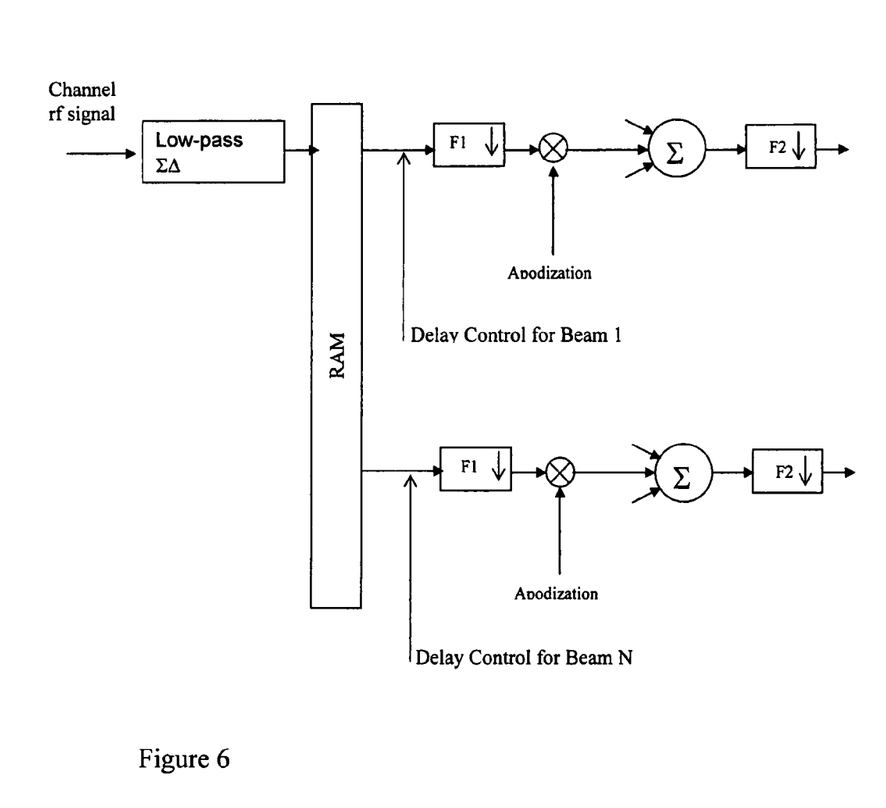
FIG. 6 is a block diagram of one embodiment of a radio-frequency receive beamformer system for multiple simultaneous beam formation.

In alternative embodiments for parallel beamforming, different paths are provided for different beams. FIGS. 5 and 6 show two example embodiments for forming multiple beams at a substantially same time based on hardware. The decimation and beamforming circuitry is duplicated, in part. The same memory 16 is used, but different selections of samples from the memory are selected for processing in the different paths. The different selections correspond to different focusing profiles for the different beams. The filters 18 of the different paths tap into the memory 16 at different locations.

FIG. 5 shows a parallel beamformer for parallel beamforming at base band. FIG. 6 shows a parallel beamformer for parallel beamforming at radio frequencies. Additional paths may be provided for substantially simultaneously forming more than two parallel beams. Alternatively, each of the paths operates in a time-multiplexed manner to provide additional beams from the same received signals.

Figure 7:
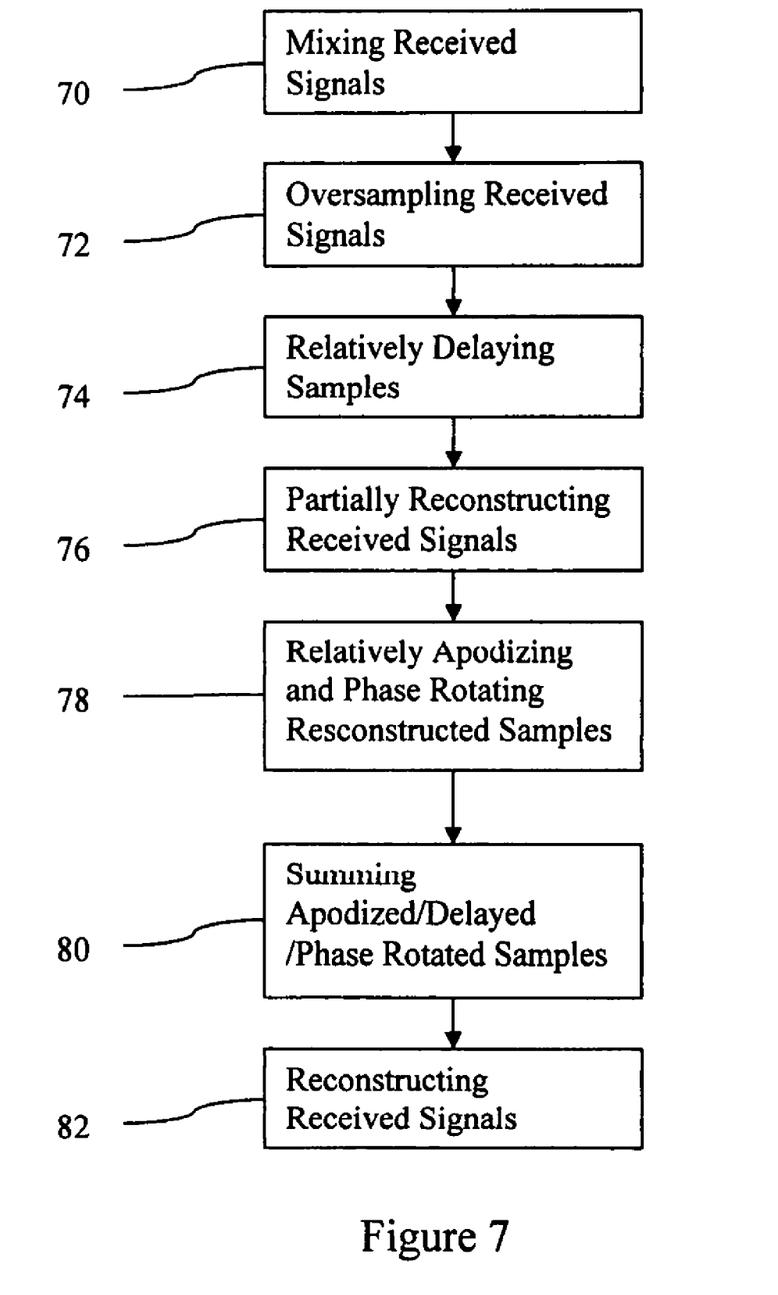
FIG. 7 is a flow chart diagram of one embodiment of a method for receive beamforming with oversampling.

FIG. 7 shows one embodiment of a method for receive beamforming ultrasound information. The method is implemented by one of the receive beamformers of FIGS. 2-6, or a different receive beamformer. The acts are performed in the order shown or a different order. Additional, different, or fewer acts may be provided. For example, act 70 is not provided in a radio frequency implementation.

In act 70, the signals received from a transducer element are mixed. The mixing is prior to oversampling. A local oscillation signal is mixed with the received signals to demodulate the signals to base band or an intermediate frequency. More than one mixing stage may be used, such as mixing to an intermediate frequency and then mixing to base band. By mixing with the local oscillation signal in two paths, ninety degrees out of phase, phase information is maintained by forming in-phase and quadrature signals. In alternative embodiments, mixing is provided after oversampling.

In act 72, the received signals in each channel are oversampled. Where the received signals are split into in-phase and quadrature signals, both paths are separately oversampled. In one embodiment, sigma-delta analog-to-digital converters oversample. The oversampling converts the received signals into digital samples. Any oversampling ratio may be provided. For example, the ratio of sampling rate to Nyquist rate is at least 20. Other rates may be used, such as from 10-200. The silicon or other semiconductor speed, such as 200 MHz-1 GHz, may limit the upper capability for the oversampling ratio. As speeds increase, other oversampling ratios may be possible. The rate is fixed, programmable, or varies.

In act 74, the oversampled signals are relatively delayed. A same or different delay is provided for each channel. The focusing profile for steering the beam and determining a focal region dynamically along the beam indicates the desired delay for a given channel. Two or more channels may have a same delay. Since the oversampled signals are provided as a function of time, the samples to be used for a given range are selected as a function of the delay. Earlier or later occurring samples are selected. A buffer or other memory may be used to provide for selecting based on the delay. Any number of samples may be selected for a given delay, such as tens or hundreds.

In one embodiment, the delay determines the entire focus. In other embodiments, the delay corresponds to a coarse focus and phase rotations provide fine focus. For example, phase rotation is applied after the relative delaying and before summation.

Different samples are selected for different depths. The focusing profile varies as a function of depth (time). By applying different delays, different samples are selected. The sample window for one delay may or may not overlap with sample windows for delays applied at other times.

In act 76, the selected samples are partially reconstructed. Partial refers to the reconstruction to a lower rate still oversampled relative to the Nyquist rate. The reconstruction is performed by filtering and/or decimating. The filtering may provide for decimating. Filtering combines information. By combining information, a lesser number of samples may be output. Any decimation rate may be provided, such as by a factor of three or more but less than the oversampling ratio of the converters. Finite or infinite impulse response filtering may be used. Since one filter is provided for each channel, to support a large number of channels on a device, the filter may be kept as simple and compact as possible. For example, the comb filter structure is used. More complex filters may be provided.

The reconstruction may provide for samples with a higher bit width. For example, the selected samples are single bits. The partial reconstruction results in two or more, such as 4-8 or 6 bits per sample. In alternative embodiments, the bit width does not change.

In act 78, the reconstructed samples are relatively apodized. The apodization profile across channels contributes to the desired beam profile, such as by reducing side lobes. The apodization profile sets a relative amplitude or contribution of each channel to the beam sum. Apodization is implemented by increasing or decreasing the amplitudes of the reconstructed samples. The apodization function varies with time or depth. The increase or decrease is performed using any function, such as addition, subtraction, multiplication, or division. For example, a deviation from unity associated with the apodization for a given channel is obtained by digital multiplication by a weight.

In act 80, the relatively focused and apodized samples are summed. The samples from the different channels are summed. All the samples are summed together with a multi-input summer, sequential summation is performed with cascaded summers, or combinations thereof are performed. The summation is performed at a data rate less than output by the initial oversampling and greater than the Nyquist rate or other rate above the Nyquist rate.

By summing focused samples from the different channels, such as sixty four or more channels, a beam sum is formed. The beam sum represents the acoustic reflection at the focal region along the scan line. By changing the focal profile as a function of time, samples representing different depths along a scan line are formed.

In act 82, the beam sum samples are reconstructed. The reconstruction reduces the data rate associated with the beam sum samples and/or increases the bit width. For example, filtering and decimation are performed. The beam sum samples are combined to reduce the data rate and increase the bit width. The bit width is increased to minimize loss of information. For example, 4 or 6 bit width samples of each beam sum are reconstructed to 8, 12, or 16 bit width samples. Any number of bit widths may be used, including maintaining a same bit width. The decimation may be by any factor, such as by one or more. In one embodiment, the decimation reduces the data rate substantially to the Nyquist sampling rate or other rate higher than the Nyquist rate.

The reduction in rate may result in an apparent loss of resolution. Fewer samples are provided along a scan line. Since the samples are at or above the Nyquist rate, sufficient samples for imaging are provided.

While the invention has been described above by reference to various embodiments, it should be understood that many changes and modifications can be made without departing from the scope of the invention. As used herein, "connected with" includes direct or indirect connection. For example, one or more hardware or software components may be between two connected components.

It is therefore intended that the foregoing detailed description be regarded as illustrative rather than limiting, and that it be understood that it is the following claims, including all equivalents, that are intended to define the spirit and scope of this invention.

We claim:

1. A receive beamformer system for beamforming ultrasound information, the receive beamformer system comprising:

first and second receive channel paths each comprising:
an oversampling analog-to-digital converter; and
a first decimation circuit connected with an output, of the converter;
a summer connected with the first and second receive channel paths; and
a second decimation circuit connected with an output of the summer;
wherein the first decimation circuit is operable to dynamically decimate under control of a dynamic delay controller.

2. The receive beamformer system of claim 1 wherein the oversampling converter is a sigma-delta analog-to-digital converter operable with an oversampling ratio of at least 10 and output with a bit width of one or more.

3. The receive beamformer system of claim 1 wherein the first decimation circuit comprises a filter operable to output signals oversampled less than output by the sigma-delta analog-to-digital converter and more than output by the second decimation circuit and operable to output signals with a bit width greater than output by the sigma-delta analog-to-digital converters and less than output by the second decimation circuit.

4. The receive beamformer of claim 3 wherein the filter is a poly-phase filter operable to effectively interpolate an input signal to a higher time resolution than a sampling interval of the oversampling analog-to-digital converter.

5. The receive beamformer system of claim 3 wherein the second decimation circuit is operable to output signals substantially at a Nyquist rate.

6. The receive beamformer system of claim 1 wherein the first decimation circuit comprises a comb filter of an order one above an order of the oversampling analog-to-digital converter.

7. The receive beamformer system of claim 1 wherein the first and second decimation circuits comprise a reconstruction filter, the first decimation circuit being a first partial reconstruction filter and the second decimation circuit being a second partial reconstruction filter.

8. The receive beamformer system of claim 1 further comprising a controller operable to select stored data from the memory as a function of a delay, the selected data being provided to the first decimation circuit; and
wherein the first and second receive channel paths each further comprise:
a memory operable to store data output by the converter;
a multiplier operable to amplify an output to the summer.

9. The receive beamformer system of claim 1 wherein the first and second receive channel paths each further comprise analog mixers operable for in-phase and quadrature paths, each of the sigma-delta analog-to-digital converters comprising a pair of low-pass converters.

10. The receive beamformer system of claim 1 wherein the oversampling analog-to-digital converter comprises a band-pass converter.

11. The receive beamformer system of claim 1 wherein the first and second receive channel paths are operable to time multiplex for forming a plurality of beams from the same received signals.

12. A method for receive beamforming ultrasound information, the method comprising:
oversampling received signals in at least two channels;
partially reconstructing, in the at least two channels, first higher bit width signals from the oversampled received signals, the first higher bit width signals having a higher bit width than the oversampled received signals;
summing the first higher bit width signals from the at least two channels; and
reconstructing second higher bit width signals from the summed first higher bit width signals, the second higher bit width signals having a higher bit width than the first higher bit width signals;
wherein partially reconstructing comprises filtering and decimating by at least two but less than an oversampling ratio.

13. The method of claim 12 wherein oversampling comprises oversampling with a ratio of sampling rate to Nyquist rate of at least 10.

14. The method of claim 12 wherein oversampling and partially reconstructing comprise oversampling and partially reconstructing in at least sixteen channels, and wherein summing comprises summing from the at least sixteen channels.

15. The method of claim 12 wherein reconstructing the second higher bit width signals comprises filtering and decimating such that the second higher bit width signals are substantially at a Nyquist rate.

16. The method of claim 12 wherein summing comprises summing at a data rate less than output by the oversampling and greater than the second higher bit width signals.

17. The method of claim 12 further comprising:
mixing the received signals prior to oversampling, the mixed received signals comprising in-phase and quadrature signals.

18. The method of claim 12 further comprising:
relatively delaying the oversampled signals of the at least two channels prior to summing; and
relatively apodizing the oversampled signals of the at least two channels prior to summing.

19. A system for receive beamforming ultrasound information, the system comprising:
an oversampling analog-to-digital converter;
a first low pass filter operable to construct first samples with a greater bit width than output from the converter;
a summer operable to sum the greater bit width samples with other samples; and
a second low pass filter operable to construct second samples from an output of the summer, the second samples having a greater bit width than the first samples.

20. The system of claim 19 wherein the converter is operable to output third samples at a rate at least 10 times a Nyquist rate and a bit width less than the first samples, wherein the first low pass filter is operable to output the first samples at a rate less than the third samples, and wherein the second low pass filter is operable to output the second samples at a rate less than the first samples.

21. The system of claim 19 further comprising:
a memory operable to store third samples output from the converter; and
a controller operable to select the third samples for outputting to the first low pass filter as a function of a delay for a beam.

* * * * *